(12) United States Patent
Habaguchi (10) Patent No.: US 7,562,049 B2
(45) Date of Patent: Jul. 14, 2009

(54) PAYMENT SYSTEM AND METHOD FOR DATA BROADCASTED FROM A REMOTE LOCATION TO VEHICLES

(75) Inventor: Masayuki Habaguchi, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 11/093,660

(22) Filed: Mar. 29, 2005

(65) Prior Publication Data

US 2006/0229980 A1  Oct. 12, 2006

(51) Int. Cl.
*G06Q 40/00* (2006.01)
(52) U.S. Cl. .................. 705/40; 725/1; 725/5
(58) Field of Classification Search ......... 705/40, 705/35, 41, 42, 44; 370/315–316, 345; 708/105, 708/109, 110
See application file for complete search history.

(56) References Cited

U.S. PATENT DOCUMENTS

| | | | |
|---|---|---|---|
| 4,404,639 A | 9/1983 | McGuire |
| 4,989,146 A | 1/1991 | Imajo |
| 5,173,691 A | 12/1992 | Sumner |
| 5,182,555 A | 1/1993 | Sumner |
| 5,359,529 A | 10/1994 | Snider |
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |
| 5,508,931 A | 4/1996 | Snider |
| 5,546,305 A | 8/1996 | Kondo |
| 5,551,064 A | 8/1996 | Nobbe et al. |
| 5,563,788 A | 10/1996 | Yoon |
| 5,590,040 A | 12/1996 | Abe et al. |
| 5,635,924 A | 6/1997 | Tran et al. |

(Continued)

OTHER PUBLICATIONS

Acidus's article, The Flawed Future of Radio, published In 2600 Magazine, Jan. 15, 2003.*

(Continued)

*Primary Examiner*—Mary Cheung
*Assistant Examiner*—Brian Fertig
(74) *Attorney, Agent, or Firm*—O'Melveny & Myers LLP; Mark E. Duell (57) ABSTRACT

The present invention is directed to a payment system and method for chargeable data that is broadcasted from a remote location. The payment system and method includes a Web site, the remote location (or a broadcasting station), and an end receiver. The Web site is configured to allow for the payment of a limited purchase amount (LPA) and to create and/or provide an encryption code. The LPA specifies an amount of chargeable data that has been purchased. The encryption code specifies the LPA at the time of payment and an authorized receiver associated with the LPA. The end receiver receives and stores the chargeable data broadcasted from the remote location. The end receiver includes an input unit for inputting the encryption code into the end receiver, and it extracts the information specifying the LPA and the authorized receiver from the inputted encryption code. The end receiver then uses an amount of the chargeable data (e.g., a song) from its storage device within the LPA if the extracted information specifying the authorized receiver matches the end receiver.

30 Claims, 6 Drawing Sheets

U.S. PATENT DOCUMENTS

| | | | |
|---|---|---|---|
| 5,636,245 A | 6/1997 | Ernst et al. | |
| 5,648,768 A | 7/1997 | Bouve | |
| 5,649,300 A | 7/1997 | Snyder et al. | |
| 5,661,787 A * | 8/1997 | Pocock | 379/101.01 |
| 5,664,948 A | 9/1997 | Dimitriadis et al. | |
| 5,671,195 A | 9/1997 | Lee | |
| 5,682,525 A | 10/1997 | Bouve et al. | |
| 5,696,676 A | 12/1997 | Takaba | |
| 5,699,056 A | 12/1997 | Yoshida | |
| 5,757,645 A | 5/1998 | Schneider et al. | |
| 5,774,827 A | 6/1998 | Smith et al. | |
| 5,802,545 A | 9/1998 | Coverdill | |
| 5,862,510 A | 1/1999 | Saga et al. | |
| 5,864,305 A | 1/1999 | Rosenquist | |
| 5,878,056 A | 3/1999 | Black et al. | |
| 5,892,463 A | 4/1999 | Hikita et al. | |
| 5,926,108 A | 7/1999 | Wicks et al. | |
| 5,931,878 A | 8/1999 | Chapin, Jr. | |
| 5,959,577 A | 9/1999 | Fan et al. | |
| 5,964,811 A | 10/1999 | Ishii et al. | |
| 5,982,298 A | 11/1999 | Lappenbusch et al. | |
| 5,999,882 A | 12/1999 | Simpson et al. | |
| 6,032,046 A | 2/2000 | Nakano | |
| 6,073,007 A | 6/2000 | Doyle | |
| 6,078,865 A | 6/2000 | Koyanagi | |
| 6,085,146 A | 7/2000 | Kuribayashi et al. | |
| 6,111,521 A | 8/2000 | Mulder et al. | |
| 6,169,894 B1 | 1/2001 | McCormick et al. | |
| 6,195,602 B1 | 2/2001 | Hazama et al. | |
| 6,208,935 B1 | 3/2001 | Yamada et al. | |
| 6,212,388 B1 | 4/2001 | Seo | |
| 6,236,330 B1 | 5/2001 | Cohen | |
| 6,240,364 B1 | 5/2001 | Kerner et al. | |
| 6,246,320 B1 | 6/2001 | Monroe | |
| 6,266,607 B1 | 7/2001 | Meis et al. | |
| 6,266,608 B1 | 7/2001 | Pertz | |
| 6,292,723 B1 | 9/2001 | Brogan et al. | |
| 6,297,748 B1 | 10/2001 | Lappenbusch et al. | |
| 6,308,120 B1 | 10/2001 | Good | |
| 6,317,686 B1 | 11/2001 | Ran | |
| 6,329,925 B1 | 12/2001 | Skiver et al. | |
| 6,330,499 B1 | 12/2001 | Chou et al. | |
| 6,339,736 B1 | 1/2002 | Moskowitz et al. | |
| 6,351,709 B2 | 2/2002 | King et al. | |
| 6,356,822 B1 | 3/2002 | Diaz et al. | |
| 6,362,730 B2 | 3/2002 | Razavi et al. | |
| 6,370,454 B1 | 4/2002 | Moore | |
| 6,373,883 B1 | 4/2002 | Sorensen et al. | |
| 6,381,533 B1 | 4/2002 | Crane et al. | |
| 6,389,337 B1 | 5/2002 | Kolls | |
| 6,397,067 B1 | 5/2002 | Tanaka et al. | |
| 6,408,307 B1 | 6/2002 | Semple et al. | |
| 6,421,593 B1 | 7/2002 | Kempen et al. | |
| 6,434,455 B1 | 8/2002 | Snow et al. | |
| 6,438,490 B2 | 8/2002 | Ohta | |
| 6,459,961 B1 | 10/2002 | Obradovich et al. | |
| 6,477,452 B2 | 11/2002 | Good | |
| 6,480,105 B2 | 11/2002 | Edwards | |
| 6,480,145 B1 | 11/2002 | Hasegawa | |
| 6,510,317 B1 | 1/2003 | Marko et al. | |
| 6,522,250 B1 | 2/2003 | Ernst et al. | |
| 6,526,335 B1 | 2/2003 | Treyz et al. | |
| 6,529,143 B2 | 3/2003 | Mikkola et al. | |
| 6,539,269 B1 | 3/2003 | Jarrow et al. | |
| 6,539,302 B1 | 3/2003 | Bender et al. | |
| 6,542,794 B2 | 4/2003 | Obradovich et al. | |
| 6,542,822 B1 | 4/2003 | Froeberg | |
| 6,549,833 B2 | 4/2003 | Katagishi et al. | |
| 6,552,682 B1 | 4/2003 | Fan | |
| 6,553,290 B1 | 4/2003 | Pillar | |
| 6,553,308 B1 | 4/2003 | Uhlmann et al. | |
| 6,553,313 B1 | 4/2003 | Froeberg | |
| 6,577,934 B2 | 6/2003 | Matsunaga et al. | |
| 6,583,734 B2 | 6/2003 | Bates et al. | |
| 6,587,759 B2 | 7/2003 | Obradovich et al. | |
| 6,587,777 B1 | 7/2003 | St. Pierre | |
| 6,587,787 B1 | 7/2003 | Yokota | |
| 6,590,507 B2 | 7/2003 | Burns | |
| 6,594,576 B2 | 7/2003 | Fan et al. | |
| 6,597,904 B1 | 7/2003 | Neustein | |
| 6,603,405 B2 | 8/2003 | Smith | |
| 6,604,038 B1 | 8/2003 | Leseky et al. | |
| 6,609,004 B1 | 8/2003 | Morse et al. | |
| 6,611,740 B2 | 8/2003 | Lowrey et al. | |
| 6,611,753 B1 | 8/2003 | Millington | |
| 6,615,130 B2 | 9/2003 | Myr | |
| 6,615,133 B2 | 9/2003 | Boies et al. | |
| 6,615,186 B1 | 9/2003 | Kolls | |
| 6,618,669 B2 | 9/2003 | Ota et al. | |
| 6,636,721 B2 | 10/2003 | Threadgill et al. | |
| 6,647,417 B1 | 11/2003 | Hunter et al. | |
| 6,654,600 B1 * | 11/2003 | Pollak et al. | 455/405 |
| 6,657,558 B2 | 12/2003 | Horita et al. | |
| 6,658,485 B1 | 12/2003 | Baber et al. | |
| 6,662,090 B2 | 12/2003 | Toyama et al. | |
| 6,662,091 B2 | 12/2003 | Wilson et al. | |
| 6,664,922 B1 | 12/2003 | Fan | |
| 6,668,219 B2 | 12/2003 | Hwang et al. | |
| 6,677,854 B2 | 1/2004 | Dix | |
| 6,680,694 B1 | 1/2004 | Knockeart et al. | |
| 6,681,120 B1 | 1/2004 | Kim | |
| 6,697,633 B1 | 2/2004 | Dogan et al. | |
| 6,701,231 B1 | 3/2004 | Borugian | |
| 6,701,232 B2 | 3/2004 | Yamaki | |
| 6,707,421 B1 | 3/2004 | Drury et al. | |
| 6,711,398 B1 | 3/2004 | Talaie et al. | |
| 6,714,797 B1 | 3/2004 | Rautila | |
| 6,720,920 B2 | 4/2004 | Breed et al. | |
| 6,721,685 B2 | 4/2004 | Kodama | |
| 6,724,827 B1 | 4/2004 | Patsiokas et al. | |
| 6,730,940 B1 | 5/2004 | Steranka et al. | |
| 6,732,031 B1 | 5/2004 | Lightner et al. | |
| 6,735,416 B1 | 5/2004 | Marko et al. | |
| 6,735,504 B2 | 5/2004 | Katagishi et al. | |
| 6,738,697 B2 | 5/2004 | Breed | |
| 6,741,188 B1 | 5/2004 | Miller et al. | |
| 6,741,834 B1 | 5/2004 | Godwin | |
| 6,748,317 B2 | 6/2004 | Maruyama et al. | |
| 6,754,485 B1 | 6/2004 | Obradovich et al. | |
| 6,754,570 B2 | 6/2004 | Iihoshi et al. | |
| 6,757,712 B1 | 6/2004 | Bastian et al. | |
| 6,785,551 B1 | 8/2004 | Richard | |
| 6,798,358 B2 | 9/2004 | Joyce et al. | |
| 6,804,589 B2 | 10/2004 | Foxford et al. | |
| 6,810,323 B1 | 10/2004 | Bullock et al. | |
| 6,812,860 B1 | 11/2004 | Schwarzalder, Jr. | |
| 6,812,888 B2 | 11/2004 | Drury et al. | |
| 6,813,549 B2 | 11/2004 | Good | |
| 6,816,778 B2 | 11/2004 | Diaz | |
| 6,819,986 B2 | 11/2004 | Hong et al. | |
| 6,823,169 B2 | 11/2004 | Marko et al. | |
| 6,823,263 B1 | 11/2004 | Kelly et al. | |
| 6,836,539 B2 | 12/2004 | Katou et al. | |
| 6,836,667 B1 | 12/2004 | Smith, Jr. | |
| 6,847,871 B2 | 1/2005 | Malik et al. | |
| 6,847,872 B2 | 1/2005 | Bodin et al. | |
| 6,847,889 B2 | 1/2005 | Park et al. | |
| 6,850,823 B2 | 2/2005 | Eun et al. | |
| 6,859,720 B2 | 2/2005 | Satoh et al. | |
| 6,870,487 B2 | 3/2005 | Nuesser et al. | |
| 6,871,067 B2 | 3/2005 | Clark et al. | |
| 6,901,374 B1 | 5/2005 | Himes | |
| 6,911,918 B2 | 6/2005 | Chen | |
| 6,920,382 B2 | 7/2005 | Katagishi et al. | |

| | | |
|---|---|---|
| 6,928,423 B1 | 8/2005 | Yamanaka |
| 6,944,430 B2 | 9/2005 | Bertstis |
| 6,971,070 B2 | 11/2005 | Obradovich et al. |
| 6,983,200 B2 | 1/2006 | Bodin et al. |
| 6,987,964 B2 | 1/2006 | Obradovich et al. |
| 7,170,390 B2 | 1/2007 | Quinones et al. |
| 7,174,301 B2 | 2/2007 | Florence et al. |
| 7,184,866 B2 | 2/2007 | Squires et al. |
| 7,216,109 B1 | 5/2007 | Donner |
| 2002/0002534 A1* | 1/2002 | Davis et al. .................... 705/39 |
| 2002/0016655 A1 | 2/2002 | Joao |
| 2002/0029339 A1* | 3/2002 | Rowe ......................... 713/182 |
| 2002/0077741 A1 | 6/2002 | Hanebrink |
| 2002/0103582 A1 | 8/2002 | Ohmura et al. |
| 2002/0161841 A1 | 10/2002 | Kinnunen |
| 2002/0198632 A1 | 12/2002 | Breed et al. |
| 2003/0043184 A1* | 3/2003 | Hilt et al. .................... 345/727 |
| 2003/0195814 A1 | 10/2003 | Striemer |
| 2004/0012501 A1 | 1/2004 | Mazzara et al. |
| 2004/0059781 A1 | 3/2004 | Yoakum et al. |
| 2004/0075774 A1* | 4/2004 | Chang et al. ................. 348/729 |
| 2004/0252197 A1 | 12/2004 | Fraley et al. |
| 2004/0260786 A1 | 12/2004 | Barile |
| 2005/0065678 A1 | 3/2005 | Smith et al. |
| 2005/0137790 A1 | 6/2005 | Yamada et al. |
| 2005/0273218 A1 | 12/2005 | Breed et al. |
| 2005/0288856 A1 | 12/2005 | Uyeki et al. |
| 2006/0055565 A1 | 3/2006 | Kawamata et al. |
| 2008/0106436 A1 | 5/2008 | Breed |

OTHER PUBLICATIONS

Sirius Satellite Radio—Help, dated Oct. 6, 2002 by archive.org, retrieved therefrom Sep. 5, 2008.*
"The Application of a Novel Two-Way Mobile Satellite Communications and Vehicle Tracking System to the Transportation Industry", Jacobs et al., Feb. 1991, IEEE Transactions on Vehicular Technology, vol. 40, No. 1, pp. 57-63.

* cited by examiner

FIG. 6

PAYMENT SYSTEM AND METHOD FOR DATA BROADCASTED FROM A REMOTE LOCATION TO VEHICLES

BACKGROUND OF THE INVENTION

1. Field of the Invention

The present invention relates generally to payment for broadcasted data provisioned to vehicles from a remote location.

2. Description of Related Art

Broadcasting systems for providing data (e.g., music, news, etc.) from a remote location to vehicles are well known in the art. As an example, a radio station can be used to broadcast data to radios included in the vehicles. Typically, when a vehicle travels too far from the radio or source station, or if there is interference by a structure or land mass, the signal of the broadcast data breaks up and fades into static.

As a result, systems and methods have been developed for a remote location to broadcast its data from far away to a vehicle's radio with greater clarity and reduced interference. For example, an XM Radio's ground station can transmit a signal to two orbiting satellites, which bounce the signals back down to radio receivers on the ground. The radio receivers are programmed to receive and unscramble the digital data signal, which contains up to 100 channels of digital audio. Thus, a vehicle equipped with an XM Radio receiver can travel through different cities without ever having to change the radio station on the vehicle.

To obtain revenue, a content provider (e.g., an XM content broadcaster or provider) may broadcast advertisements to vehicles having XM radio receivers by interrupting content with the advertisements. This revenue model is consistent with other conventional broadcast media providers. But, these advertising techniques are not desirable because the interruptions may reduce the enjoyment of the requested content.

A content provider may also obtain revenue by requiring an end user of an XM radio receiver to pay a subscription fee to access a desired XM channel. There are many drawbacks to the current method and system for subscribing to an desired XM signal. For example, there are numerous types of content that are offered to users via the subscribed XM signal, but a user may not want to pay for or subscribe to all of this content in the XM signal.

As a result, it would be desirable to provide a method and system that realizes the advantages of the above-described broadcasting system and also promotes revenue generation for the broadcasters and cost savings for the end-users. Specifically, there is a need for a system and method that allows for broadcasted data (e.g., music) to be provided via the above described system and for a user to pay for an individual piece of the data (e.g., a song) that overcomes the above-described shortcomings of the prior art while retaining their advantages.

SUMMARY OF THE INVENTION

The present invention addresses the shortcomings of the prior art systems and methods. In particular, the present invention is directed to a payment system and method for data or an individual piece of data (e.g., a song) broadcasted from a remote location to a vehicle.

Pursuant to an aspect of the invention, a payment system and method for chargeable data is developed. The payment system and method includes a Web site, a remote location (or a broadcasting station), and an end receiver. The Web site is configured to allow for payment of a limited purchase amount (LPA) and to create and/or provide an encryption code. The LPA specifies an amount of chargeable data that has been purchased. The encryption code specifies the LPA at the time of payment and an authorized receiver associated with the LPA. The Web site may also be configured to specify the authorized receiver from information specifying a vehicle that contains the authorized receiver. Alternatively, rather than specifying the authorized receiver, the encryption code specifies the LPA at the time of payment and an authorized vehicle associated with the LPA.

In one embodiment of the invention, a content provider via the remote location broadcasts the chargeable data. The end receiver includes a storage device and is configured to receive the chargeable data and to store the chargeable data in its storage device. The end receiver also includes an input unit for inputting the encryption code, and it is configured to extract the information specifying the LPA and the authorized receiver (and/or the authorized vehicle) from the encryption code. The end receiver then reproduces or plays back an amount of the chargeable data (e.g., a song) from its storage device within the LPA if the extracted information specifying the authorized receiver matches the end receiver. Alternatively, rather than using the information regarding the authorized receiver and if the end receiver is on board a vehicle, the end receiver is configured to use the amount of the chargeable data (e.g., the song) from its storage device within the LPA if the extracted information specifying the authorized vehicle matches the vehicle containing the end receiver.

A more complete understanding of the system and method for the payment for broadcasted data from a remote location to a vehicle will be afforded to those skilled in the art, as well as a realization of additional advantages and objects thereof, by a consideration of the following detailed description of the preferred embodiment. Reference will be made to the appended sheets of drawings which will first be briefly described.

DETAILED DESCRIPTION OF THE PREFERRED EMBODIMENT

The present invention is directed to a payment system and method for broadcasting data or an individual piece of data (e.g., a song) from a remote location to a vehicle.

Figure 1:
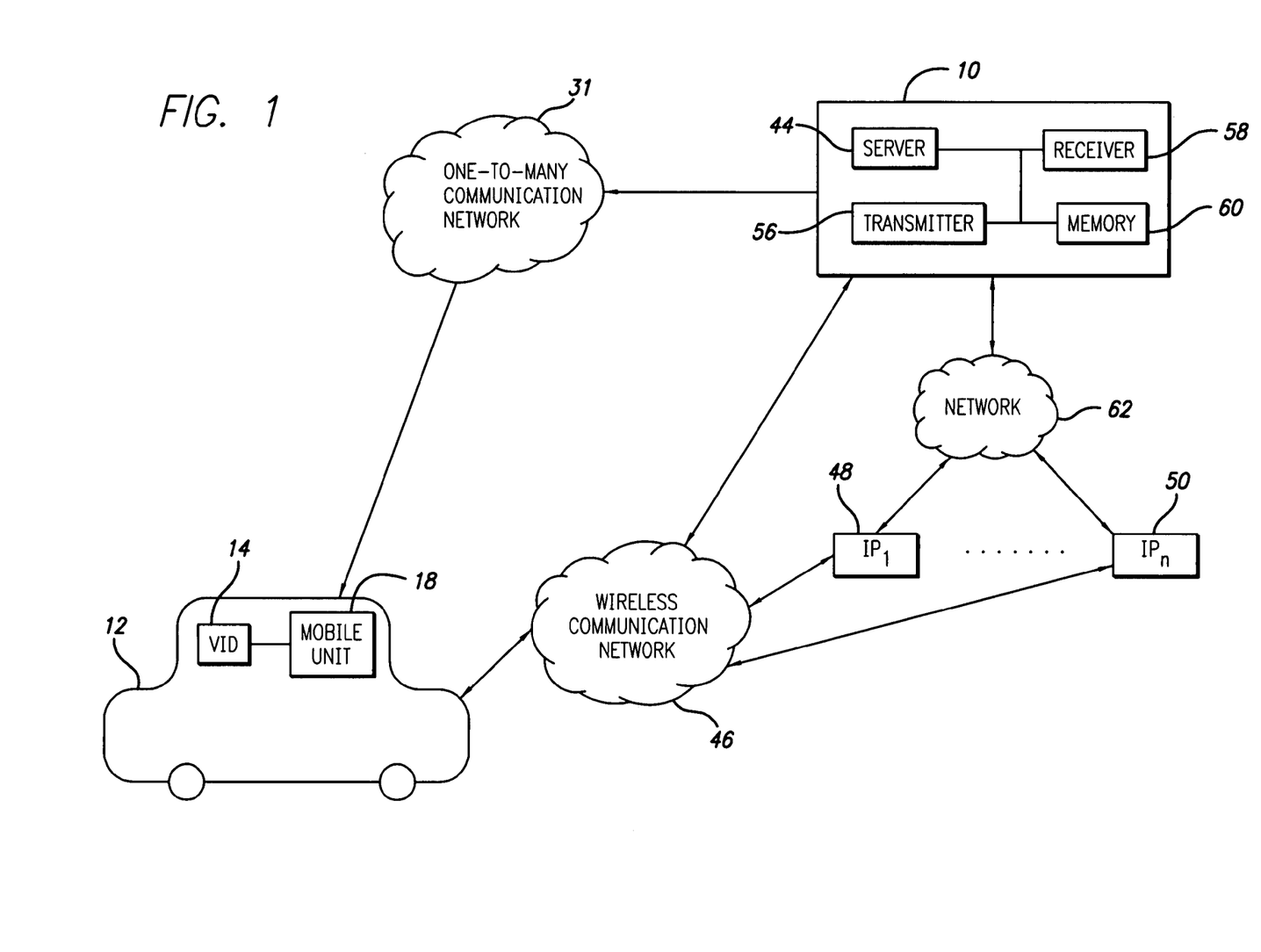
FIG. 1 is a schematic diagram of an embodiment of a system pursuant to aspects of the invention.

FIG. 1 shows a first embodiment of a system for exchanging information between a remote location 10 and a vehicle 12 pursuant to aspects of the invention. The vehicle 12 includes a vehicle information device (VID) 14 and a mobile unit 18. As provided in greater detail below, the VID can include a receiving and storing device (e.g., an end receiver or an XM radio receiver).

Figure 1A:
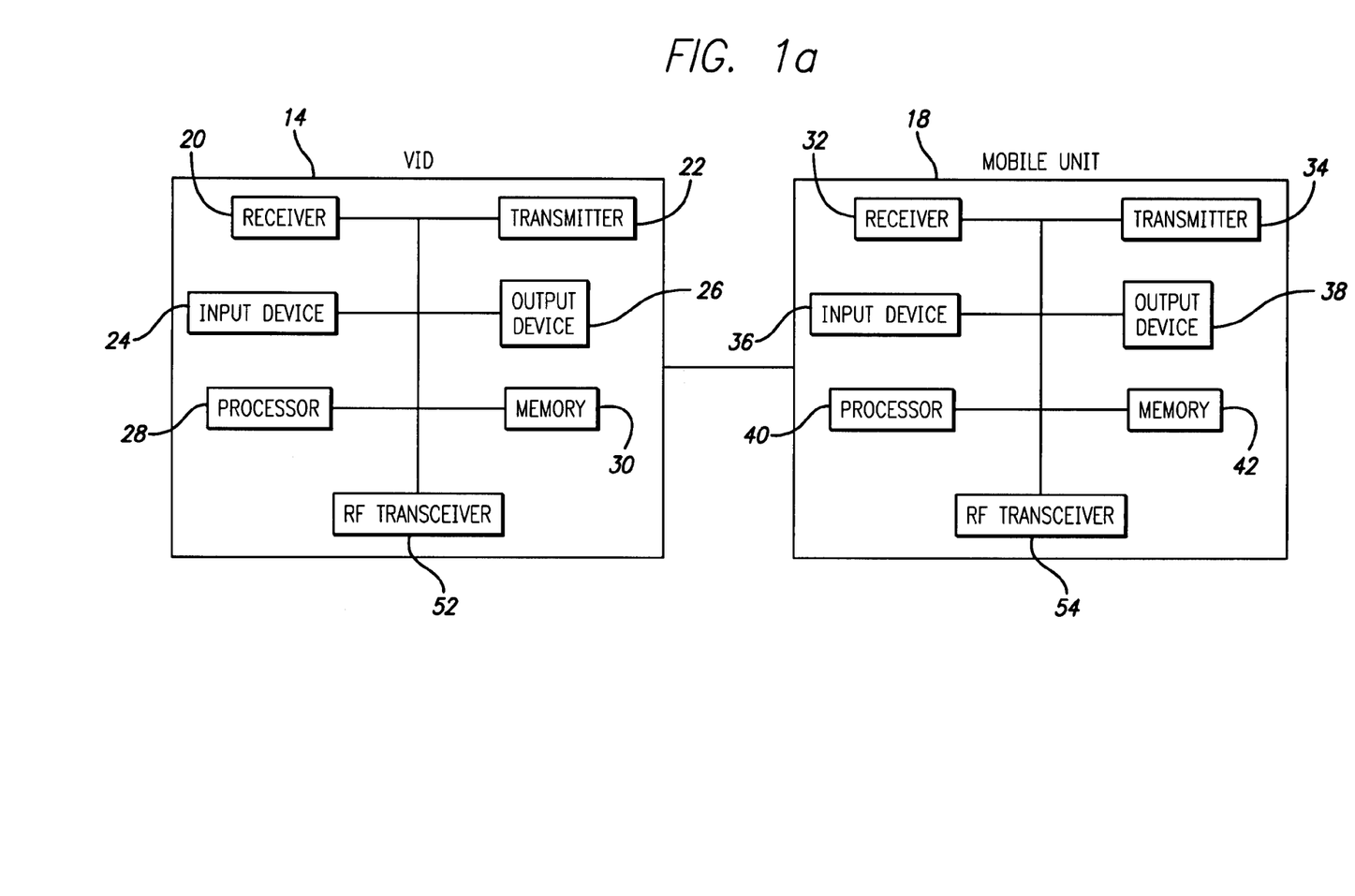
FIG. 1*a* is a schematic diagram of a vehicle information device (VID) in communication with a mobile unit.

As shown in FIG. 1a, the vehicle includes a VID receiver 20, a VID transmitter 22, VID input 24 and output 26 devices, a VID processor 28, and a VID memory 30 that are all in electrical communication with one another. The VID memory 30 includes at least a portion of the user profile and, in some embodiments, includes the entire user profile. As provided in greater detail below, the user profile stored in the VID memory 30 may be updated from within the vehicle by way of the VID input device 24, which includes at least a keyboard, a touch sensitive display and/or a microphone. The user profile may also be updated by way of information received through the VID receiver 20.

The VID receiver 20 receives information from the remote location 10 (e.g., an XM content provider or a radio station) and, in one embodiment, is in communication with the remote location 10 by way of a one-to-many communication system. One-to-many communication systems include systems that can send information from one source to a plurality of receivers, such as a one-to-many communication network 31 (e.g., a broadcast network or a one-way communication network). Broadcast networks include television, radio, and satellite networks. In one embodiment, the broadcast network 31 is the XM Radio satellite network, which comprises broadcast towers, satellite servers, and satellites. The information received by the VID receiver 20 may be accessed by way of the VID output device 26, which includes at least one of a VID display and a VID speaker. The VID receiver 20 and output device 26 may provide access to only a subset of the information broadcasted to the user based on user preferences. The user preferences, as well as user identity information and vehicle identity information, are part of the user profile.

In the first embodiment, the mobile unit 18 is used to receive and transmit information from and to the remote location 10. In an alternate embodiment shown in FIG. 2, an RF transceiver 252 is used to receive and transmit information from and to the remote location 210. The mobile unit 18 may be a wireless phone or any other device that communicates with other devices by way of a wireless communication network 46 (e.g., a one-to-one communication network or a two-way communication network). As shown in FIG. 1a, the mobile unit 18 includes a mobile unit receiver 32, a mobile unit transmitter 34, mobile-unit input 36 and output 38 devices, a mobile unit processor 40, and a mobile unit memory 42 that are in communication with one another. The mobile unit 18 is in communication with the remote location 10 by way of the mobile-unit receiver 32, the mobile unit transmitter 34, and the wireless communication network 46, which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel is used. The mobile unit receiver 32 receives information from the remote location 10, and the mobile unit transmitter 34 transmits information to the remote location 10. The mobile unit transmitter 34 may also transmit information to information providers 48, 50.

In one embodiment, the information received from and transmitted to the remote location 10 by way of the mobile unit 18 is accessed by the user through the VID 14, which is in communication with the mobile unit. The mobile unit 18 may be embedded in the vehicle 12 and be in communication with the VID 14 by, for example, a cable.

In another embodiment, the VID 14 and mobile unit 18 are in communication with one another by way of RF transceivers 52, 54. Both the VID 14 and the mobile unit 18 include RF transceivers 52, 54, which, in one embodiment, comply with the Bluetooth ® wireless data communication format. The RF transceivers 52, 54 allow the VID 14 and the mobile unit 18 to communicate with one another. In other embodiments not shown, the VID and mobile unit receivers 20, 32 and transmitters 22, 34 allow the VID and the mobile unit to communicate with one another. In yet other embodiments, there may be an RF transceiver that is separate from the VID 14 and the mobile unit 18 and that allows the VID and the mobile unit to communicate with one another.

Figure 2:
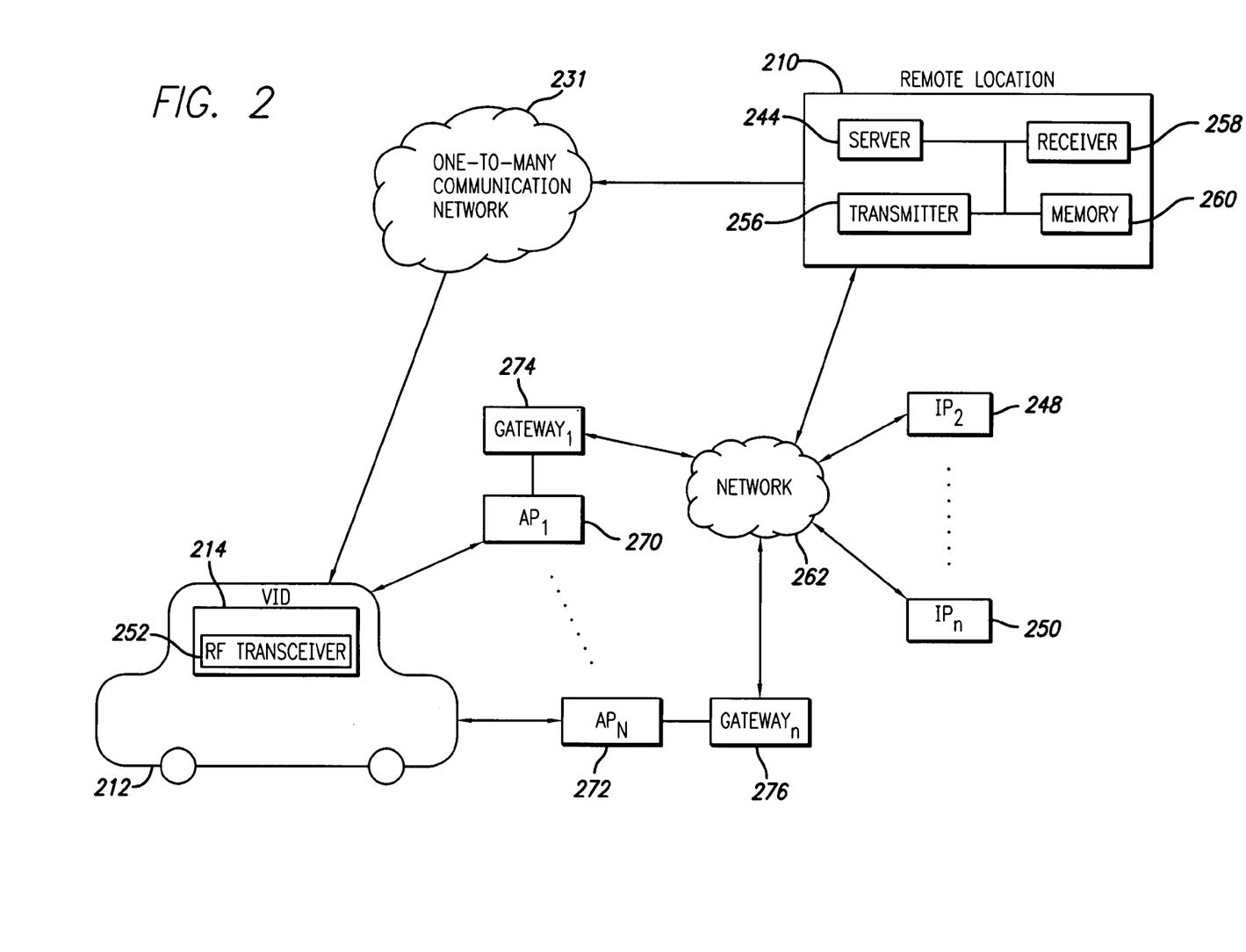
FIG. 2 a schematic diagram of an alternate embodiment of a system in accordance with the invention.

In the alternate embodiment shown in FIG. 2, the VID 214 transmits and receives information to and from the remote location 210 by way of the RF transceiver 252, access points 270, 272, and gateways 274, 276 that are in communication with the network 262. In one embodiment, the RF transceiver 252 and access points 270, 272 are compliant with the IEEE 802.11 specification, and such transceivers and access points include Wi-Fi® certified equipment. The access points 270, 272 are typically in communication with the gateways 274, 276 by way of a cable, and the gateways are in communication with the remote location 210 by way of the network 262. The access points 270, 272 are in communication with the RF transceiver 252 and have a limited range over which they can communicate with the RF transceiver 252. Thus, it is preferable that there be numerous access points 270, 272 positioned so that the distance between the access points and the areas through which a vehicle 212 might pass is less than or equal to the limited range of the access points. When the access points 270, 272 are so positioned, the RF transceiver 252 can effectively exchange information with the access points 270, 272 and, thus, the remote location 210.

Note that in the alternate embodiment of FIG. 2, the VID 214 also includes VID input and output devices, a VID receiver, a VID memory and a VID processor, none of which are shown. The VID components of the alternate embodiment of the VID 214 have the same functionality as the VID components of the first embodiment of the VID 14.

The remote location 10, 210 includes a remote server 44, 244, a remote transmitter 56, 256, a remote receiver 58, 258, and a remote memory 60, 260 that are in communication with one another. As provided above with respect to the first embodiment, the remote transmitter and receiver 56, 58 communicate with the VID 14 and the mobile unit 18 by way of the broadcast 31 and wireless 46 communication networks, respectively. In the alternate embodiment, the remote transmitter and receiver 256, 258 communicate with the VID 214, including the RF transceiver 252, by way of the broadcast communication network 231 and a network 262. The remote location 10, 210 can also be in communication with information providers 48, 50, 248, 250, such as vehicle dealers, vehicle service providers, XM radio content providers, radio stations, and users of the vehicles, by way of the network 62, 262.

In both the first and alternate embodiments shown in FIGS. 1 and 2, the network 62, 262 is typically a wide area network (WAN) such as the Internet. In other embodiments, some of the information providers 48, 50, 248, 250, such as the vehicle dealers and vehicle service providers, may be in communication with the remote location 10, 210 by way of a local area network (LAN), while other information providers 48, 50, 248, 250 such as the vehicle users, are in communication with the remote location by way of the Internet. In yet other embodiments, the RF transceiver 252 is in communication with the remote location 210 and/or the information providers 248, 250 by way of a network 262 that is a LAN. In these other embodiments, the LAN 262 is compliant with the IEEE 802.3 specification or is an Ethernet network.

The information providers 48, 50, 248, 250 may transmit updated user profiles and new vehicle-related information to the remote location 10, 210. A plurality of user profiles are contained in a user profile database, which, along with other vehicle-related information, is stored in the remote memory 60, 260. The new vehicle-related information and updated user profiles are transmitted from the remote location 10, 210 to the VID 14, 214 by way of the broadcast network 31, 231. In other embodiments, the new vehicle-related information and updated user profiles may be transmitted to the vehicles 12, 212 by way of the wireless network 46 or the network 262. At the vehicle, the user profile stored in the VID memory 30 is updated, and the vehicle-related information is made accessible to the user by way of the VID output device 26. In other embodiments, the information providers may communicate directly with the mobile unit 18 or RF transceiver 252 by way of the wireless communication network 46 or the network 262.

Figure 3:
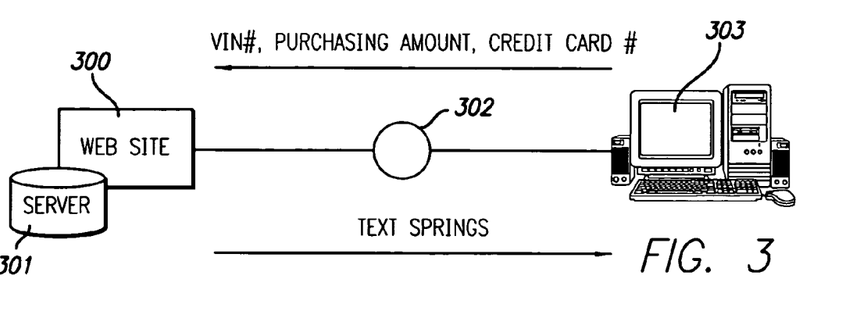
FIG. 3 is a schematic diagram of an embodiment of a client and server system.

FIG. 3 shows a payment method and system for chargeable data (e.g., a song) broadcasted over a one-to-many communication network (e.g., 31 or 231) to a vehicle pursuant to aspects of the invention. The embodiment includes a Web site 300 created on a server system 301. The server system 301 is connected to a client computer 303 via the Internet 302 so that the Web site 300 is accessible to a customer or user on the client computer 303. The Web site can be accessed by the customer when an end receiver (e.g., 14) is sold, when a broadcasting contract is made, or any other time. The Web site 300 allows the customer to buy a limited purchase amount (LPA) for chargeable data. The customer can make payment of the LPA by entering credit card numbers into a page of the Web site 300. The server system 301 stores and manages the customer's personal information (e.g., the Vehicle Identification Numbers, the purchased amount, and/or the credit card numbers of the customer). The server system 301 can also be used to store other information specifying the customer and/or a receiver (e.g., an XM receiver) owned by the customer and/or associated with the LPA, such as the serial number of the receiver.

After the payment is completed, the server system 301 creates an encryption code which includes information specifying the LPA for chargeable data and/or information specifying the receiver owned by the purchasing customer (or associated with the LPA). As an example, if the LPA is $20 and if the information specifying the receiver is the serial number of that receiver, then five characters are used to encrypt the $20 (e.g., "A2C4D") and another five characters are used to encrypt the serial number (e.g., "123ZY"). The encrypted characters are then incorporated into an encryption code such as "ABCDXXA2C4DXX123ZY" and provided to the customer. The ABCD or XX characters in the above exemplary code indicate other information such as valid terms and control characters.

FIGS. 1 and 2 illustrate a VID (e.g., 14 or 214) pursuant to aspects of the invention, and as previously discussed, the VID can be a receiving and storing device (e.g., an XM Radio receiver). In the present invention, the receiving and storing device is the end mechanism (or end receiver) by which the customer accesses the chargeable data broadcasted over the one-to-many communication network (e.g., 31 or 231). The receiving and storing device includes the electronics needed to interface itself (including its audio speakers) with the one-to-many communication network and to receive chargeable data from the remote location.

Figures 4, 5:
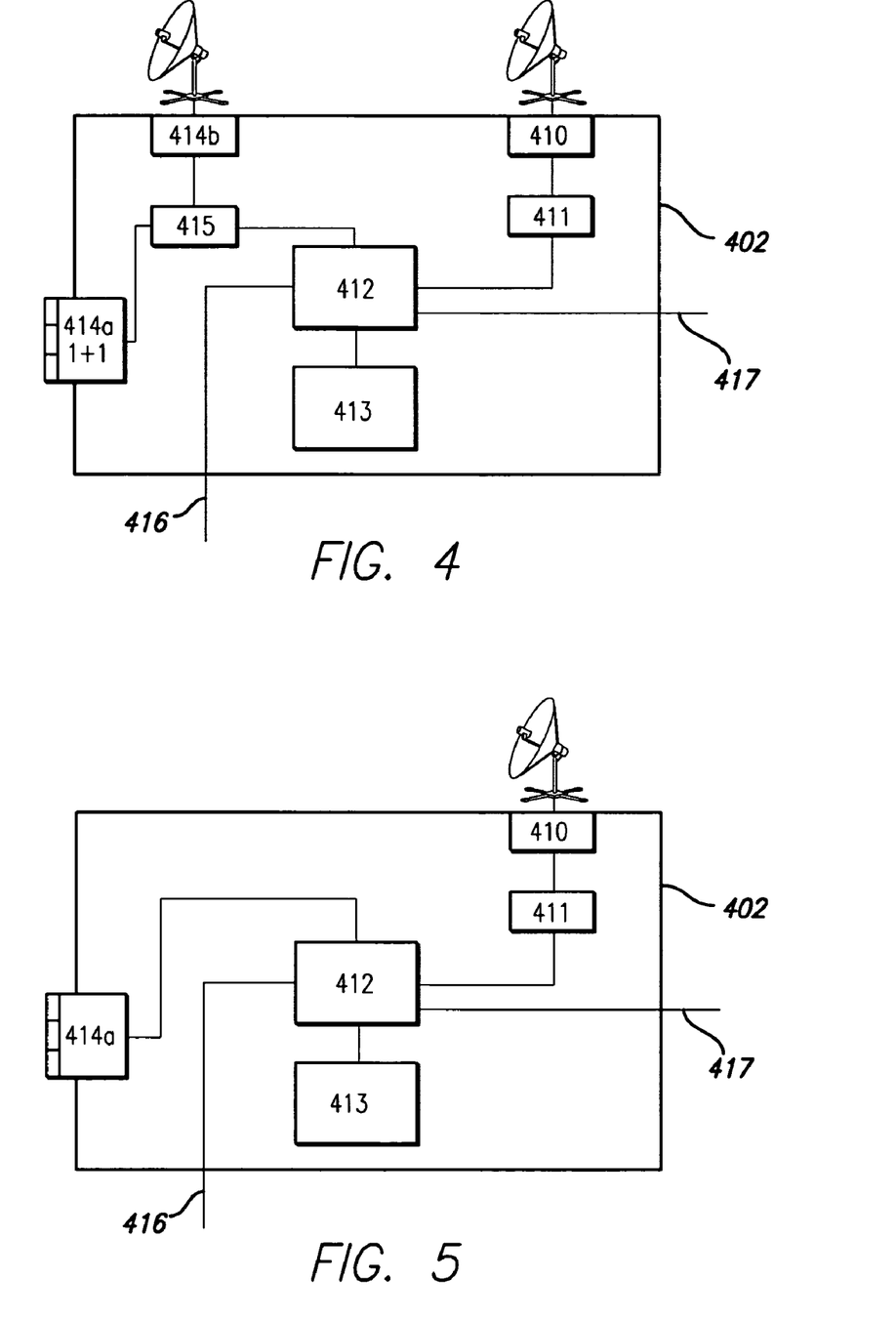
FIG. 4 is a schematic diagram of an embodiment of a receiving and storing device.
FIG. 5 is a schematic diagram of an alternate embodiment of a receiving and storing device.

In particular, FIG. 4 shows another VID or a receiving and storing device pursuant to aspects of the invention. The receiving and storing device 402 of FIG. 4 includes a broadcast data receiver 410, a broadcast data restoring unit 411, a data control unit (or processor) 412, a storage device (or memory) 413, a touch-type input device 414a, a wireless input device 414b, an input unit control 415 (for controlling data transmission from 414a and/or 414b to 412), a pay data output line 416 (for outputting the chargeable data), and a display device output line 417, which are all in electrical communication with one another. An encryption code (e.g., "ABCDXXA2C4DXX123ZY") can be inputted by way of the touch-type input device 414a, which includes at least a keyboard or a touch sensitive display. In the embodiment of FIG. 4, the encryption code may also be wirelessly inputted into the receiving and storing device 402 by way of information received through the wireless input device 414b. In one embodiment, the encryption code is first inputted and/or transmitted (e.g., via a wireless network 46 in FIG. 1) to a portable device or a mobile unit (e.g., 18 in FIG. 1). The portable device or mobile unit has the ability to output the encryption code to the receiving and storing device 402 via an infrared light or radio wave, as described above with reference to FIGS. 1 and 1a. In the present embodiment, the portable device or mobile unit can be a portable personal computer (PC), a personal digital assistant (PDA), a cell phone, etc. The communication method via the radio wave could be Bluetooth or IEEE802.11, etc. Accordingly, it should be appreciated that FIG. 4 depicts an exemplary embodiment in which the encryption code can be inputted by either or both the touch type input device 414a and/or the wireless type input device 414b.

Figure 6:
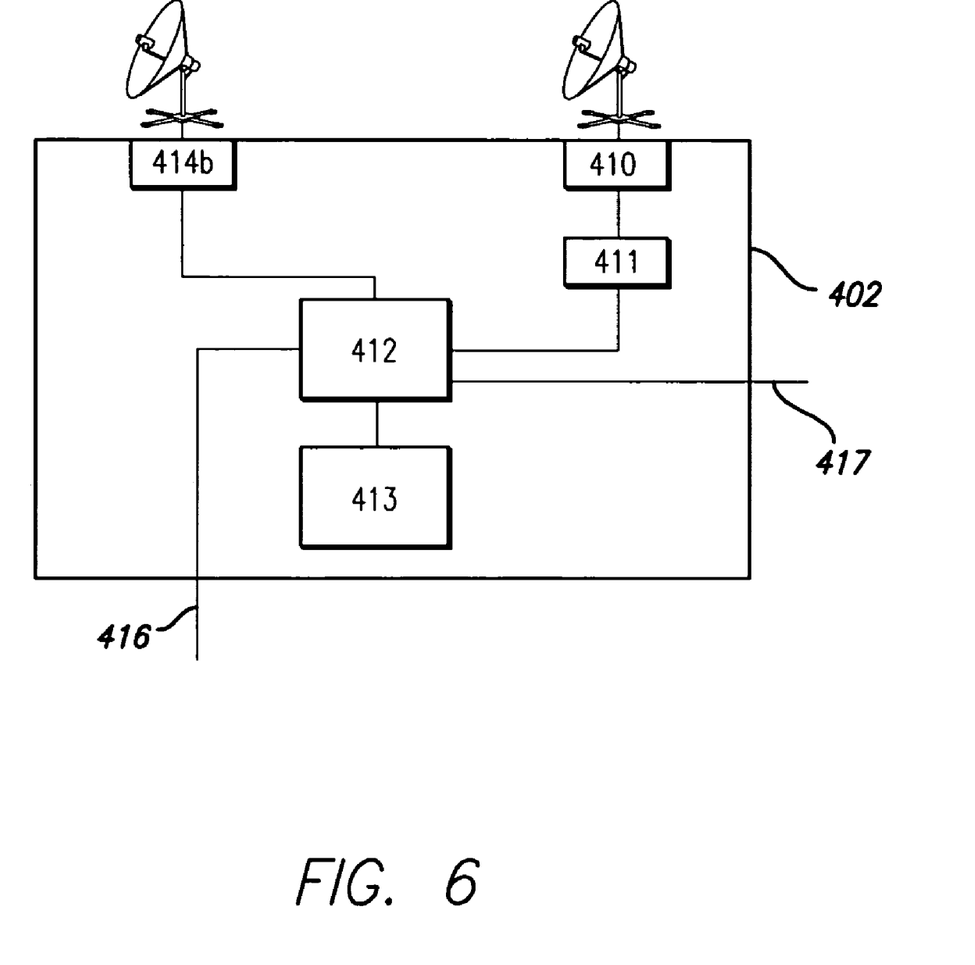
FIG. 6 is a schematic diagram of a further embodiment of a receiving and storing device.
Figure 7:
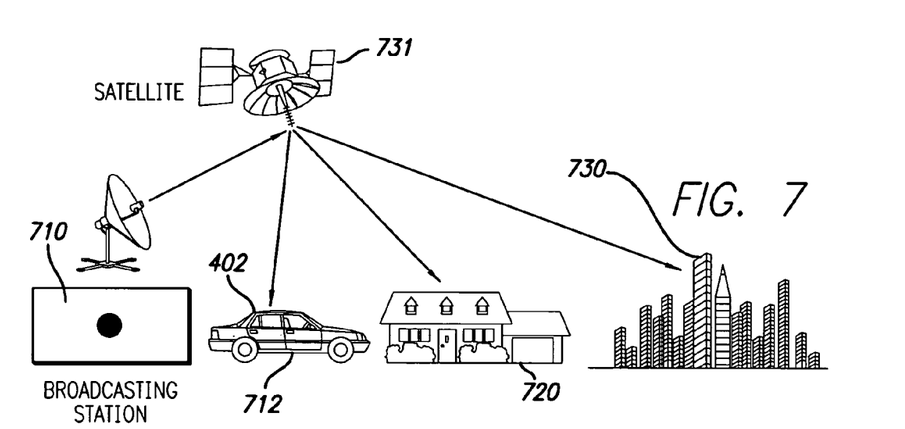
FIG. 7 is a schematic diagram of an embodiment of a system for broadcasting chargeable data.
Figure 8:
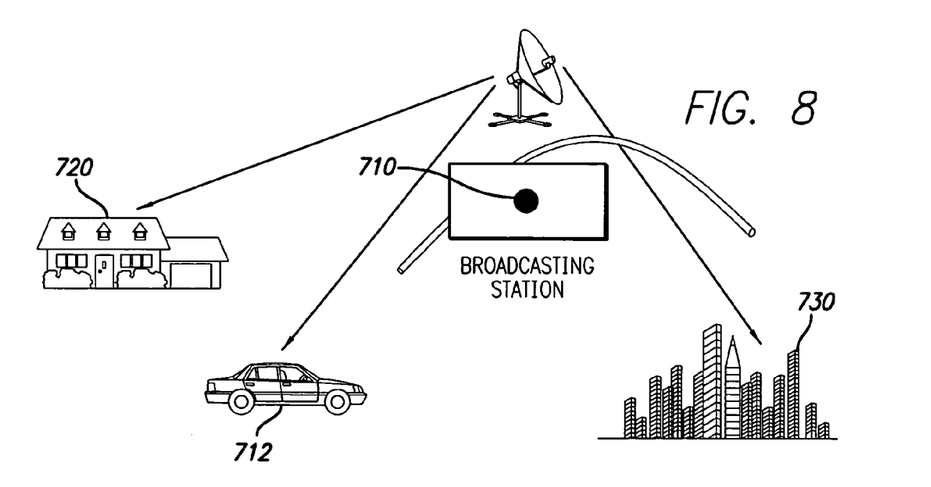
FIG. 8 is a schematic diagram of an alternate embodiment of a system for broadcasting chargeable data.

By way of contrast to FIG. 4, FIG. 5 depicts an example of an input embodiment utilizing only the touch-type input device 414a and FIG. 6 depicts an input embodiment by way of only wireless communication. Note that in the alternative embodiments of FIGS. 5 and 6, the receiving and storing device 402 also each includes a broadcast data receiver 410, a broadcast data restoring unit 411, a data control unit (or processor) 412, a storage device (or memory) 413, a pay data output line 416, and a display device output line 417. These components of the alternative embodiments have the same functionality as do the like components of the embodiment of FIG. 4. In operation, and referring now also to FIG. 7, a broadcasting station 710 digitally broadcasts chargeable data such as music. A receiving and storing device 402 (e.g., an end receiver, an on-board receiver, or an XM radio receiver) receives the broadcasted chargeable data on its broadcast data receiver 410, restores the data via the broadcast data restoring unit 411, and stores the data in the storage device 413. In the embodiment shown in FIG. 7, the receiving and storing device or end receiver 402 is located in a vehicle 712. Alternatively, the end receiver 402 can be located in a house 720 or in another place 730. In addition, FIG. 7 shows that the broadcasting station 401 broadcasts the chargeable data by first sending the data up to an orbiting satellite 710 that bounces the data back down to the vehicle 712. In an alternative embodiment shown in FIG. 8, the chargeable data can be directly broadcasted from the broadcasting station 710 to the vehicle 712, the house 720, and/or another place 730.

Once the chargeable data is broadcasted by the broadcasting station 710 and is received and stored by the receiving and storing device 402, a program running on the data control unit 412 then maintains, overwrites, and/or disposes of the stored chargeable data based on a data control protocol. For example, after being kept for fourteen (14) days, the program disposes of the stored chargeable data if the data is not purchased and/or overwrites the data if it exceeds a determined capacity. An optional embodiment for providing a direct playback of music without storage on the end receiver 402 can also be provided.

In addition, the data control unit 412 includes a microprocessor and memory to extract the LPA information from the encryption code and information specifying the receiver associated with the LPA. The data control unit 412 then compares the information from the encryption code with the information specifying the end receiver 402 that is written in the memory of the end receiver 402 and, if they match (i.e., the written serial number and the extracted serial number), permits the usage of the stored chargeable data in the storage device 413 within the LPA. For example, if the chargeable data is a song, its title and price is shown, and the customer or user of the end receiver 402 makes the selection within the LPA. The selected piece of music (or the song) may also include a flag for usage availability and/or playback possibility (e.g., playback in stereo, playback in mono, and/or automatic playback at a predetermined time). Reproducing, using, and/or playing music data that is not purchased is prohibited by the data control unit 412. Also, the remaining balance of the LPA is stored in the memory, and can be used later.

As discussed above, the end receiver (or receiving and storing device) 402 has an input device 414 for inputting the encryption code. For example, a combination of buttons or a combination of touch switches on the display can be used (e.g., 414a) to input the encryption code. Also, a method to input the encryption code by wireless communication can also be used. In an embodiment of this wireless input method, the encryption code is first inputted and/or transmitted to a portable device (or mobile unit) that has the ability to output and/or transmit the encryption code via an infrared light or a radio wave to the end receiver. As discussed, FIG. 4 depicts an example with both the wireless and the touch input methods; FIG. 5 depicts an example with input by a combination of buttons; and FIG. 6 depicts an example with input by wireless communication.

Referring now to FIGS. 3 to 8, a more particular embodiment of the invention includes a Web site 300, a remote location (or a broadcasting station) 710, and an end receiver 402. The Web site 300 is configured to allow a payment of a limited purchase amount (LPA), to allow an entry of information specifying an authorized receiver, and/or to create and/or provide an encryption code. The information specifying the authorized receiver can be its serial number. The LPA specifies an amount of chargeable data that has been purchased. The encryption code specifies the LPA at the time of payment and the authorized receiver associated with the LPA. A content provider via the remote location 710 broadcasts the chargeable data. The end receiver 402 includes a storage device and is configured to receive the chargeable data and to store the chargeable data in its storage device 413. The end receiver 402 also includes an input unit 414 for inputting the encryption code into the end receiver 402. The encryption code can be broadcasted (e.g., via a satellite) from the remote location (or the broadcasting station) 710 and/or transmitted (e.g., via a mobile unit and a one-to-one communication network) from the remote location 710 and/or another remote location (e.g., 10 or 210). The encryption code can then be wirelessly entered by the input unit 414b. Alternatively, the encryption code can be manually entered by the input unit 414a.

Regardless of how the encryption code is entered, the end receiver 402 then extracts the information specifying the LPA and the authorized receiver from the encryption code once the code is entered. The end receiver 402 then uses an amount of the chargeable data (e.g., a song) from its storage device 413 within the LPA if the extracted information specifying the authorized receiver matches the end receiver 402.

A second more particular embodiment of the invention also includes a Web site 300, a remote location (or a broadcasting station) 602, and an end receiver 402. The Web site 300 is configured to allow a payment of a limited purchase amount (LPA), to allow an entry of information specifying an authorized vehicle, and/or to create and/or provide an encryption code. The information specifying the authorized vehicle can be a vehicle identification number (VIN#) of the authorized vehicle.

The Web site 300 in this second more particular embodiment is configured to specify an authorized receiver from information specifying the authorized vehicle. In the embodiment, the Web site 300 may maintain and manage combinations of VIN#'s and corresponding on-board receivers, refer the VIN#'s and the corresponding on-board receivers to specify the authorized receiver from the inputted VIN#, and/or create the encryption code using either information specifying the authorized receiver and/or the VIN#.

Alternatively, the encryption code is created and/or provided by the Web site 300 (and/or the server system 301) only from the information specifying the authorized vehicle, and rather than using the Web site 300 to identify the authorized receiver, the end receiver 402 is used to specify the authorized receiver through the memory of the end receiver 402. In this alternate case, to prevent problems that may occur when the end receiver 402 is reinstalled into another vehicle, information specifying the authorized receiver (e.g., the serial number of the authorized receiver and/or the VIN# corresponding to the authorized receiver), which the end receiver 402 maintains in its memory, is or can be renewed once it has been reinstalled.

Like the first more particular embodiment, the end receiver 402 in this embodiment includes a storage device 413 and is configured to receive the chargeable data and to store the chargeable data. The end receiver 402 also includes an input unit 414 for entering the encryption code into the end receiver 402. The encryption code can be broadcasted and/or transmitted and then be wirelessly entered by the input unit 414b. The code can also be manually entered by the input unit 414a. The end receiver 402 is further configured to extract the information specifying the LPA and the authorized receiver from the encryption code. Once the encryption code has been entered and extracted, the end receiver 402 then uses an amount of the chargeable data (e.g., a song) from its storage device 413 within the LPA if the extracted information specifying the authorized receiver (or the authorized vehicle) matches the end receiver 402.

A third more specific embodiment of the invention includes a Web site 300, a remote location (or a broadcasting station) 710, and an end receiver 402. The Web site 300 is configured to allow a payment of a limited purchase amount (LPA), to allow an entry of information specifying a vehicle, and/or to create and/or provide an encryption code. The LPA specifies an amount of chargeable data that has been purchased. The encryption code specifies the LPA at the time of payment and the vehicle associated within the LPA. The remote location 710 broadcasts the chargeable data. The end receiver 402 includes a storage device and is configured to receive the chargeable data and to store the chargeable data in its storage device 413. The end receiver 402 also includes an input unit 414 for entering the encryption code into the end receiver 402. The encryption code can be broadcasted and/or transmitted and be wirelessly entered by the input unit 414b.

The encryption code can also be manually entered by the input unit 414*a*. The end receiver 402 is further configured to extract the information specifying the LPA and the vehicle from the encryption code. The end receiver 402 then uses an amount of the chargeable data (e.g., a song) from its storage device within the LPA if the extracted information matches the end receiver 402 (i.e., if the vehicle specified by the encryption code matches the vehicle housing the end receiver 402).

Having thus described a preferred embodiment of a payment method and system for broadcasted data, it should be apparent to those skilled in the art that certain advantages of the invention have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks. The invention is further defined by the following claims.

What is claimed:

1. A payment system for chargeable data comprising:
   a server providing a Web site and creating an encryption code, said Web site allowing a payment of a limited purchase amount (LPA) and an entry of a first receiver associated with said LPA, said encryption code specifying said LPA at the time of said payment and said first receiver ID;
   a remote location broadcasting chargeable data, pricing data and title data; and
   a second receiver having a storage device and an input device, said second receiver receiving said broadcasted chargeable data, said pricing data and said title data and storing said chargeable data said pricing data and said into said second receiver, said second receiver extracting said LPA and said first receiver ID from said entered encryption code;
   wherein said second receiver is configured to determine whether said pricing data is within extracted LPA, determine whether said extracted first receiver ID matches a second receiver ID, and, based on said determination, use said chargeable data.

2. The system of claim 1, wherein said input device comprises a wireless input device.

3. The system of claim 2, wherein said encryption code is broadcasted from said remote location to said wireless input device.

4. The system of claim 3, further comprising a satellite, wherein said remote location broadcasts said encryption code to said second receiver via said satellite.

5. The system of claim 2, further comprising a mobile unit and a one-to-one communication network, wherein said remote location transmits said encryption code to said mobile unit via said one-to-one communication network and wherein said mobile unit transmits said encryption code to said wireless input device.

6. The system of claim 5, wherein said one-to-one communication network comprises a wireless communication network having a high bandwidth channel, wherein said encryption code is transmitted to said mobile unit via said high bandwidth channel, and wherein said mobile unit transmits said encryption code to said wireless input device of said second receiver via electromagnetic radiation comprising one of an infrared light and a radio wave.

7. The system of claim 1, wherein said input device comprises a button-type input device.

8. The system of claim 7, wherein said encryption code is provided by said Web site and entered into said button-type input device.

9. The system of claim 1, wherein said encryption code comprises an encrypted serial number of said first receiver.

10. The system of claim 1, wherein said utilized amount of said chargeable data comprises a song.

11. The system of claim 1, further comprising a pay data output line for displaying said used amount of said chargeable data.

12. The system of claim 1, further comprising a satellite and wherein said remote location broadcasts said chargeable data to said second receiver via said satellite.

13. A payment system for chargeable data comprising:
    a server providing a Web site and creating an encryption code, said Web site allowing a payment of a limited purchase amount (LPA) and an entry of information specifying a first vehicle associated with said LPA, said encryption code specifying said LPA at the time of said payment and said information specifying said first vehicle;
    a remote location broadcasting chargeable data; and
    an end receiver on board a second vehicle, said end receiver having a storage device and an input device, said end receiver receiving said broadcasted chargeable data and storing said chargeable data in said storage device, said input device inputting said encryption code into said end receiver, said end receiver extracting said LPA and said information specifying said first vehicle from said inputted encryption code;
    wherein said end receiver is configured to determine whether said pricing data is within said LPA, determine whether said information specifying said first vehicle matches information specifying said second vehicle, and, based on said determinations, use said chargeable data.

14. The system of claim 13, wherein said information specifying said first vehicle comprises a first vehicle identification number (VIN#).

15. The system of claim 14, wherein said server is adapted to maintaining and managing a plurality of VIN#'s and a plurality of corresponding on-board receivers.

16. The system of claim 15, wherein said server is further adapted to identify an authorized receiver using said first VIN#, said plurality of VIN#'s and said plurality of corresponding on-board receivers.

17. The system of claim 16, wherein said information specifying said said first vehicle comprises said authorized receiver, wherein said information specifying said second vehicle comprises said end receiver, and wherein said information specifying said first vehicle matches said information specifying said second vehicle when said authorized receiver matches said end receiver.

18. The system of claim 14, wherein said end receiver comprises a memory for extracting an authorized receiver from said first VIN#, wherein said information specifying said first vehicle comprises said authorized receiver, wherein said information specifying said second vehicle comprises said end receiver, and wherein said information specifying said first vehicle matches said information specifying said second vehicle when said authorized receiver matches said end receiver.

19. The payment system of claim 18, wherein said memory can be renewed with a new authorized receiver when said end receiver is reinstalled into another vehicle.

20. The system of claim 14, wherein said information specifying said second vehicle comprises a second VIN# and wherein said information specifying said first vehicle matches said information specifying said second vehicle when said first VIN# matches said second VIN#.

21. A payment method for chargeable data comprising:
receiving payment for a limited purchase amount (LPA);
specifying a first receiver associated with said LPA;
creating an encryption code that specifies said LPA at the time of said payment;
broadcasting chargeable data to an end receiver;
storing said broadcasted chargeable data and said price data on a storage device of said end receiver;
entering said encryption code via an input device into said end receiver;
extracting said LPA and a first receiver ID from said entered encryption code by said end receiver;
determining whether said price data is within said LPA;
determining whether said first receiver ID matches an end receiver ID; and
based on said determinations, using chargeable data.

22. The method of claim 21, wherein said specifying step comprises entering a serial number of said first receiver.

23. The method of claim 21, wherein said specifying step comprises entering a vehicle identification number (VIN#).

24. The method of claim 23, wherein said specifying step further comprises maintaining and managing a plurality of VIN#'s and a plurality of corresponding on-board receivers.

25. The method of claim 24, wherein said specifying step further comprises using said maintained and managed VIN#'s and corresponding on-broad receivers to specify said first receiver from said entered VIN#.

26. The method of claim 23, wherein said specifying step further comprises using memory on said end receiver to extract a serial number of said first receiver from said entered VIN#.

27. The method claim 26, further comprising renewing said end receiver with a new serial number when said end receiver is reinstalled into another vehicle.

28. The method of claim 21, further comprising broadcasting wirelessly said encryption code from said remote location to said input device via a satellite.

29. The method of claim 21, further comprising:
transmitting wirelessly said encryption code from said remote location to a mobile unit via a one-to-one communication network; and
transmitting said encryption code from said mobile unit to said input device.

30. The system of claim 21, further comprising providing said encryption code by said Web site and wherein said entering said encryption code comprises entering said encryption code into a plurality buttons on said input device.

* * * * *